US009081985B1

(12) United States Patent
Naguib (10) Patent No.: US 9,081,985 B1
(45) Date of Patent: *Jul. 14, 2015

(54) SYSTEM AND METHOD FOR OPERATING A COMPUTING DEVICE IN A SECURE MODE

(71) Applicant: Google Inc., Mountain View, CA (US)

(72) Inventor: Nayer Naguib, Dublin (IE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,634

(22) Filed: Feb. 26, 2014

Related U.S. Application Data

(63) Continuation of application No. 12/827,330, filed on Jun. 30, 2010, now Pat. No. 8,700,895.

(51) Int. Cl.
*G06F 21/62* (2013.01)

(52) U.S. Cl.
CPC .................. *G06F 21/6218* (2013.01)

(58) Field of Classification Search
CPC ............ H04L 63/0428; H04L 63/1416; G06F 9/4401; G06F 21/6218; G06F 9/4406; G06F 2221/2107; G06F 9/44505; G06F 21/6209
USPC .............................. 713/1–2, 164–165; 726/22
See application file for complete search history.

(56) References Cited

U.S. PATENT DOCUMENTS

| | | | |
|---|---|---|---|
| 6,192,477 B1 * | 2/2001 | Corthell | 726/11 |
| 6,961,759 B2 * | 11/2005 | Brown et al. | 709/217 |
| 7,072,869 B2 | 7/2006 | Guthery | |
| 7,117,369 B1 | 10/2006 | Burns et al. | |
| 7,130,951 B1 * | 10/2006 | Christie et al. | 710/261 |
| 7,315,830 B1 | 1/2008 | Wirtz et al. | |
| 7,424,398 B2 | 9/2008 | Booth et al. | |
| 7,571,484 B2 * | 8/2009 | Kraus et al. | 726/26 |
| 7,716,494 B2 | 5/2010 | Liu et al. | |

(Continued)

FOREIGN PATENT DOCUMENTS

WO 2006120365 A1 11/2006
WO 2008067124 A2 6/2008

OTHER PUBLICATIONS

Arbaugh et al. "A secure and reliable bootstrap architecture", Security and Privacy, 1997, Proceedings, 1997 IEEE Symposium, 1997, pp. 65-71.*

(Continued)

*Primary Examiner* — Michael Chao
*Assistant Examiner* — Shiuh-Huei Ku
(74) *Attorney, Agent, or Firm* — Lerner, David, Littenberg, Krumholz & Mentlik, LLP (57) ABSTRACT

A computing device operates in a secure operating mode in response to user selection. Computer hardware is initialized to verify a bootloader of an operating system, and the bootloader verifies the operating system kernel. The kernel then verifies operating-system level executable files. After verification, a limited set of the verified files is loaded into a portion of the memory that is subsequently marked by the kernel as read-only. These files are executed to provide a basic Internet browser session; all other files are identified as non-executable. When the user accesses an authorized website and conducts a transaction that requires a user to provide information, the information is encrypted during transmission of the network. In addition, such information cannot be accessed by other parties since the information provided is not persisted at the computing device.

20 Claims, 4 Drawing Sheets

(56) References Cited

U.S. PATENT DOCUMENTS

| | | | |
|---|---|---|---|
| 7,831,838 B2 * | 11/2010 | Marr et al. | 713/187 |
| 7,844,551 B1 | 11/2010 | Bottner et al. | |
| 8,108,318 B2 | 1/2012 | Mardikar | |
| 8,171,295 B2 | 5/2012 | Munetoh et al. | |
| 8,181,020 B2 * | 5/2012 | Flynn | 713/164 |
| 8,312,523 B2 | 11/2012 | Geller | |
| 2002/0016913 A1 | 2/2002 | Wheeler et al. | |
| 2005/0119978 A1 | 6/2005 | Ates | |
| 2006/0015717 A1 | 1/2006 | Liu et al. | |
| 2006/0090084 A1 * | 4/2006 | Buer | 713/189 |
| 2006/0161435 A1 | 7/2006 | Atef et al. | |
| 2006/0242423 A1 | 10/2006 | Kussmaul | |
| 2007/0005492 A1 | 1/2007 | Kim | |
| 2007/0088950 A1 | 4/2007 | Wheeler et al. | |
| 2007/0219926 A1 | 9/2007 | Korn | |
| 2008/0005560 A1 | 1/2008 | Duffus et al. | |
| 2009/0119194 A1 | 5/2009 | Chau et al. | |
| 2009/0282247 A1 | 11/2009 | Kirkup et al. | |
| 2010/0088237 A1 | 4/2010 | Wankmueller | |
| 2011/0004721 A1 | 1/2011 | Smith et al. | |
| 2011/0231332 A1 | 9/2011 | Abraham et al. | |

OTHER PUBLICATIONS

Arbaugh, William A.; Farber, D.J.; Smith, Jonathan M., "A Secure and Reliable Bootstrap Architecture." Security and Privacy, 1997, Proceedings., 1997 IEEE Symposium on. 1997, pp. 65-71 [retrieved on Mar. 6, 2013 from IEEE database].

Gookwon Edward Suh (AEGIS: A Single-Chip Secure Processor, 2005).

* cited by examiner

SYSTEM AND METHOD FOR OPERATING A COMPUTING DEVICE IN A SECURE MODE

CROSS-REFERENCE TO RELATED APPLICATIONS

The present application is a continuation of U.S. patent application Ser. No. 12/827,330, filed Jun. 30, 2010, the disclosure of which is incorporated herein by reference.

BACKGROUND OF THE INVENTION

1. Field of the Invention

The invention relates generally to a secure operating mode of a computer device and, more particularly, to a secure operating mode of a computing device for executing security-critical Internet applications and preventing interception of user-provided information.

2. Description of Related Art

Many categories of Internet based services require a high degree of security. Examples include Internet banking, electronic interaction with government services, and documents or files that are provided with a legally binding digital signature. Typical computing environments may not be secure enough to prevent a user from being exposed to different types of attacks that seek to capture user-provided information and to use the captured information to process fraudulent transactions.

Unscrupulous third parties may capture user-provided information in different ways. In one example, a keylogger program may be installed on the user's computer to capture information entered using a keyboard. The keylogger program may be installed by exploiting operating system vulnerabilities or by deceiving the user to execute malicious software. In another example, the user may be transported to a website where user-provided information may be captured. In a further example, a computer display may be manipulated to deceive the user into signing a fraudulent transaction using a legally-binding digital signature.

Existing operating systems are unable to prevent the capture of confidential information by these types of attacks. Many browsers and Internet security programs warn against visiting websites with invalid security certificates or following phishing links; such warnings, however, are commonly ignored. In addition, existing operating systems may be patched at any level (e.g., bootloader, kernel, drivers, etc.). Accordingly, such warnings may be disabled by malicious software.

It may be difficult to avoid malicious software which could act as a keylogger or modify a user's display. Malicious software is under continuous development, and may be tailored to target a limited set of users in which case the malicious software may not be identified even by up-to-date antivirus and internet security software. In some cases, a computing system may be infected without the user installing any software, as in the case of browser vulnerabilities which allow remote code execution.

Some existing solutions for preventing third party capture of user-provided information rely on external hardware to achieve a sufficient level of security. In one example, an external smart card reader is connected to the computer to download transaction details. The user may view the transaction details on the reader's display, insert a smart card that contains a private key into the reader, and enter a personal identification number (PIN) in order to sign the transaction. The smart card reader may prevent capture of the PIN and the reader's firmware may not be manipulated by the computer since the reader only downloads transaction data from the computer. In other words, executable instructions are not downloaded to the reader. However, the requirement of an additional smart card reader increases costs and the use of smart cards is inconvenient.

It is important to prevent interception of user-provided information while executing security-critical Internet-related applications on a computing device.

BRIEF SUMMARY OF THE INVENTION

Aspects of the invention provide a user with the ability to select a secure operating mode of a computing device before the operating system of the computing device is booted. Before receiving selection of the secure operating mode, computer hardware is initialized to verify a bootloader of an operating system to guarantee that the bootloader is not patched. Then, in response to receiving selection of the secure operating mode, the bootloader verifies the operating system kernel. The kernel then verifies operating-system level executable files. The files that are verified may be limited to the files to be loaded into memory. After verification, at least some of the verified files are loaded into a portion of the memory that is identified by the kernel as read-only. These files are executed to provide a basic Internet browser session; all other files are identified by the kernel as non-executable. When the user accesses an authorized website and conducts a transaction that requires a user to provide information, such information cannot be accessed by other parties since the information provided is encrypted over the network and is not persisted to the local file system. The information may be stored in memory at the computing device as part of the data related to the browser process. The memory, however, is cleared when the user session ends.

In accordance with one embodiment of the invention, a method of providing a secure operating mode of a computing device is provided. The method comprises verifying the integrity of a bootloader. A user of the computing device is then provided with an option to select a normal operating mode or a secure operating mode. After a selection of the secure operating mode is received, other components of the computing device are verified. In one example, the components that are verified include an operating system kernel file, and operating-system level executable files to be executed in the secure operating mode. The verified files are executed to communicate with a server and conduct a transaction. Information input to the computing device during the transaction is not persisted in a file system of the computing device and cannot be tracked after the user session ends.

In accordance with another embodiment of the invention, a system for providing a secure operating mode of a computing device is provided. The system comprises a storage means and a processor logically coupled to the storage means. The storage means stores a bootloader, an operating system kernel and executable files to enable the computing device to communicate over a network. The processor uses read-only firmware to verify the bootloader. The processor is also operable to receive a selection to operate the computing device in a secure operating mode. The processor is additionally operable to verify the operating system kernel and a set of the files to be executed in the secure operating mode. The processor is further operable to execute at least some of the verified files while communicating over the network and conducting a transaction. Information input to the computing device during the transaction is not persisted in the storage means and cannot be tracked after the user session ends.

DETAILED DESCRIPTION

The aspects, features and advantages of the invention will be appreciated when considered with reference to the following description of preferred embodiments and accompanying figures. The following description does not limit the invention; rather, the scope of the invention is defined by the appended claims and equivalents.

While certain processes in accordance with aspects of the invention are shown in the figures as occurring in a linear fashion, this is not a requirement unless expressly stated herein. Different processes may be performed in a different order or concurrently.

Aspects of the invention provide systems and methods for providing a user with an option to select a normal operating mode or a secure operating mode of a computing device. Before receiving selection of the secure operating mode, boot firmware verifies a bootloader of an operating system. Then, in response to receiving selection of the secure operating mode, the bootloader verifies the operating system kernel. The kernel then verifies operating-system level executable files (e.g., device drivers). After verification, a limited set of the executable files are loaded into a portion of the memory that is identified by the kernel as read-only memory. These read-only files are executed to provide a basic Internet browser session; all other files are identified as non-executable. When the user accesses an authorized website and conducts a transaction, information provided by the user cannot be accessed by other parties since the information is not persisted on the file system on the computing device.

In some embodiments, the same operating system kernel can be used for both normal and secure modes. In one example, the bootloader (or BIOS) passes a parameter to the kernel to specify whether to boot in normal mode or in secure mode based on user selection. Most modern operating system kernels can accept parameters that specify different modes of operation. Accordingly, it is unnecessary to install two separate operating systems (or different subsets of operating system files, such as different kernels, drivers, etc.)

Figure 1:
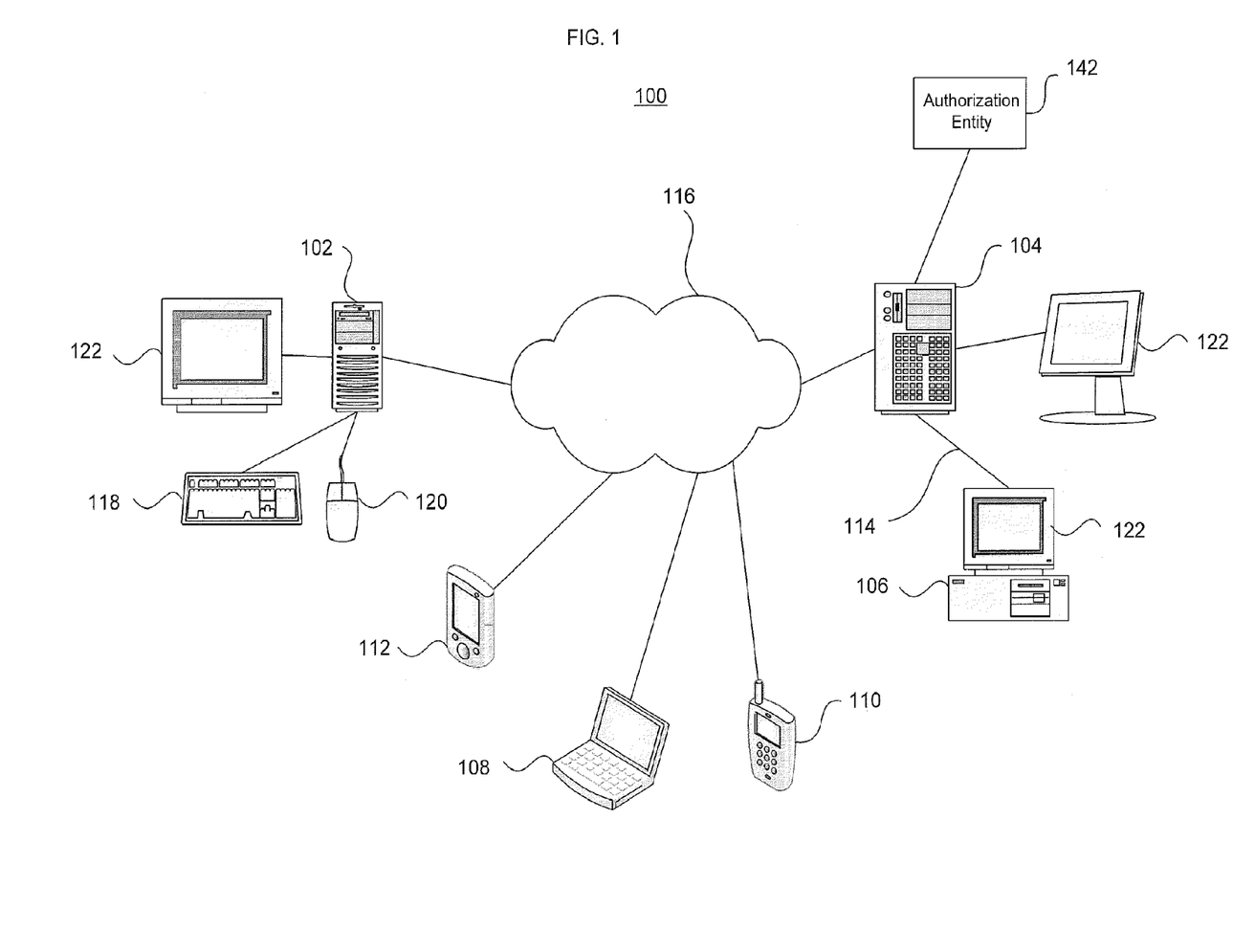
FIG. 1 illustrates a system in accordance with aspects of the invention.

FIG. 1 presents a schematic diagram of a computer system depicting various computing devices that can be used alone or in a networked configuration in accordance with aspects of the invention. For example, this figure illustrates a computer network 100 having a plurality of computers 102, 104, 106 and 108 as well as other types of devices such as portable electronic devices such as a mobile phone 110 and a PDA 112. Such devices may be interconnected via a local or direct connection 114 and/or may be coupled via a communications network 116 such as a LAN, WAN, the Internet, etc. and which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop.

Figure 2:
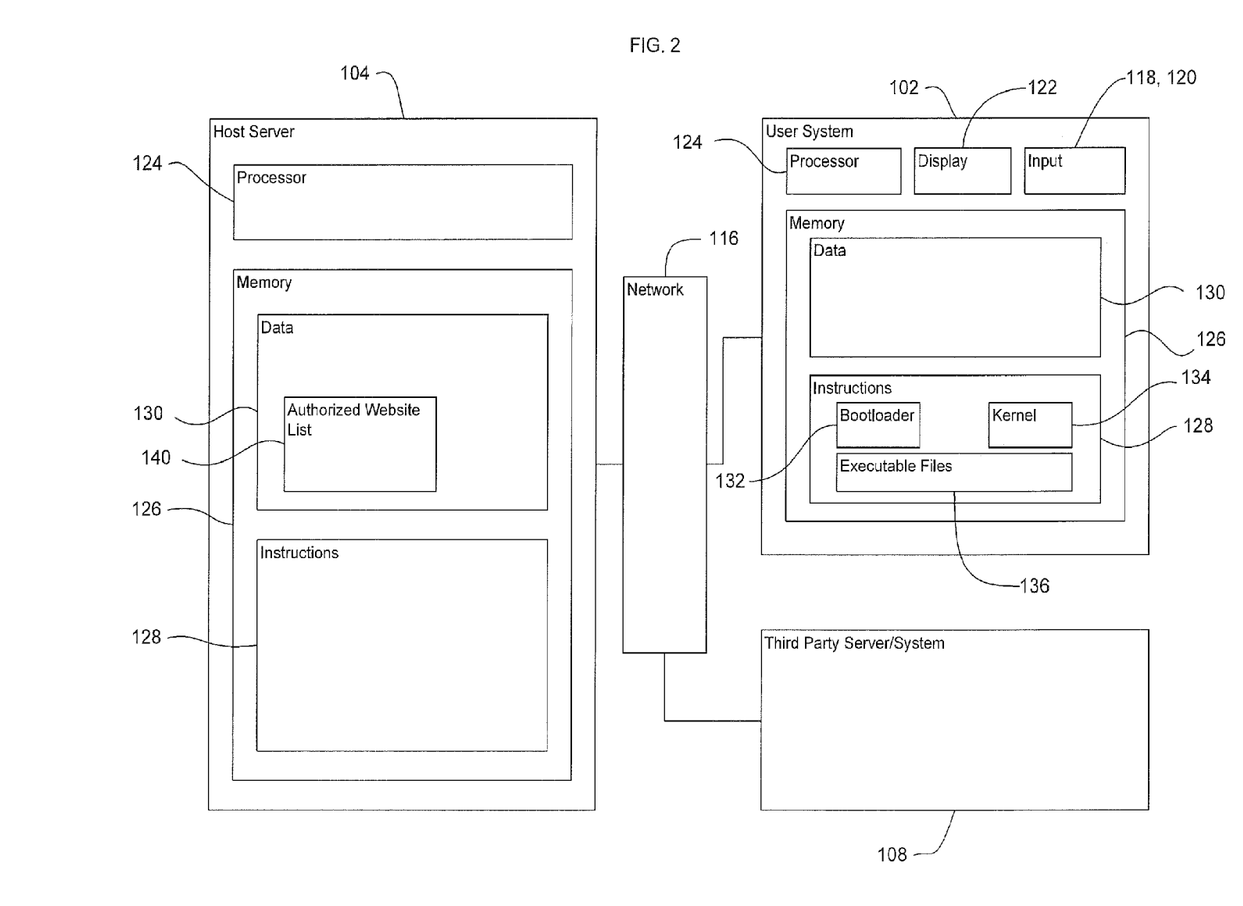
FIG. 2 illustrates aspects of the system of FIG. 1.

As shown in FIG. 2, each computer such as computers 102 and 104 contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor. The memory/storage 126 may be of any type or any device capable of storing information accessible by the processor, such as a hard-drive, ROM, RAM, CD-ROM, flash memories, write-capable or read-only memories. The processor 124 may comprise any number of well known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code.

In accordance with aspects of the invention, the instructions 128 on the computer 102 may include a bootloader 132, an operating system kernel 134 and executable files 136. The bootloader 132 loads and executes the operating system kernel 134. The operating system kernel 134 continues startup procedures for the computer 102 by linking application software (e.g., executable files 136) and the computer hardware (e.g., processor 124, display 122, keyboard 118, and mouse 120). The functions, methods and routines of instructions in accordance with the invention are explained in more detail below.

Data 130 may be retrieved, stored or modified by processor 124 in accordance with the instructions 128. The data may be stored as a collection of data.

The data may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

In accordance with aspects of the invention, the data 130 stored on computer 102 may comprise information regarding the minimum set of executable files 136 that are required to provide a user with a basic Internet browser session. The data 130 on computer 104 may also include a list of specific websites 140 that are identified as secure (e.g., an "authorized website list").

Although the processor 124 and memory 126 are functionally illustrated in FIG. 2 as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives or the like.

In one aspect, server 104 may communicate with one or more client computers 102, 106 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 104 and user computers and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network 116, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem.

Moreover, computers and user devices in accordance with the systems and methods described herein may comprise any device capable of processing instructions and transmitting data to and from other computers, including network computers lacking local storage capability, PDA's with modems such as PDA 112 and Internet-capable wireless phones such as mobile phone 110.

As shown in FIG. 1, the network 100 may also include an authorization entity 142, which may be directly or indirectly coupled to server 104. In an alternative, the authorization entity 140 may be part of or otherwise logically associated with the server 104.

When the computer 102 is first powered on, the computer 102 does not have an operating system stored in ROM or RAM. The bootloader 132 executes a program stored in memory 126 to load the operating system kernel 134. The bootloader 132 also loads the minimum amount of data needed by the kernel 134 to access other portions of memory 126 from which the executable files 136 and data are loaded. Although only one bootloader 132 is shown in FIG. 2, one having ordinary skill in the art would appreciate that multiple stage bootloaders may be used to sequentially load and process several programs to boot the computer 102.

Once loaded, the operating system kernel 134 continues startup procedures for the computer 102. The kernel 134 provides a bridge between application software and the data processing that is performed at the hardware level. The kernel 134 manages system resources by communicating between hardware and software components of the computer.

The authorization entity 140 and the sever 104 may comprise an authorization server. As will be explained in more detail below, the authorization entity 140 is operable to identify specific web sites as secure. This may be accomplished by performing a verification process and maintaining a list of the web sites that are identified as being authorized. In accordance with aspects of the invention, the authorized web sites may be accessed by the computer 102 during a secure operating mode such that any information provided by a user while interacting with an authorized web site cannot be intercepted by third parties.

While the invention is described with reference to accessing web sites from a computing device, one having ordinary skill in the art would appreciate that the invention may be used to provide a secure computing environment when accessing any object over any type of network. For example, a computing device operating in the secure mode may communicate over a network to access any object identified by a uniform resource indicator (URI) or uniform resource locator (URL). Similarly, the computing device operating in the secure mode may access an object from any network location such as from an FTP server or a storage area network (SAN).

In one illustrative example, a user wants to process a security-critical banking transaction, such as a money transfer using a debit account. The user chooses to boot a computing device in the secure operating mode. In the secure operating mode, the bootloader and the kernel are verified and only the executable files that are necessary to provide a basic Internet browsing session are loaded into ROM. Accordingly, the operating system executes on the computing device using a minimum amount of components. The user may then select a bank web site from a list of authorized web sites displayed by the browser (assuming that the bank has already registered with an authorization entity such that the bank web site has already been added to the list of authorized web sites). The web site is then launched, and the user provides confidential information (e.g., username, password, PIN, etc.) in order to successfully login to the web site. The user may then initiate the desired transaction, provide all the necessary details and confirm the transaction. Since the executable files are operating as read-only, the information provided by the user is temporarily stored in volatile memory that is marked as non-executable by the kernel until the user session ends. However, the user data is not written to permanent storage such that the information cannot be accessed by unauthorized parties. The user may then log off from the bank web site and reboot the computing device to begin another browsing session in normal operating mode.

Figure 3A:
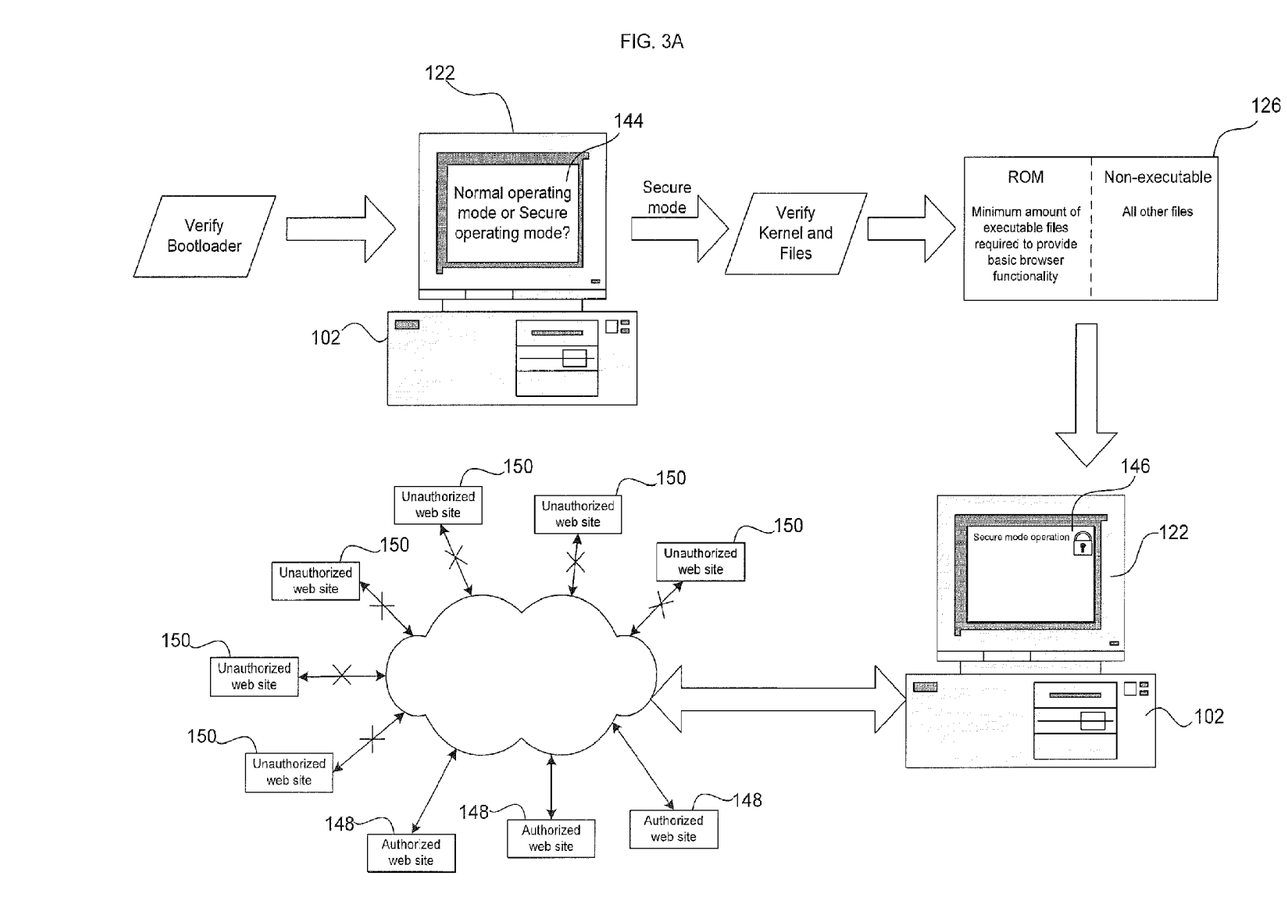
FIGS. 3A-B illustrate a system and method for operating a computing device in a secure mode to prevent interception of user-provided data in accordance with aspects of the invention.
Figure 3B:
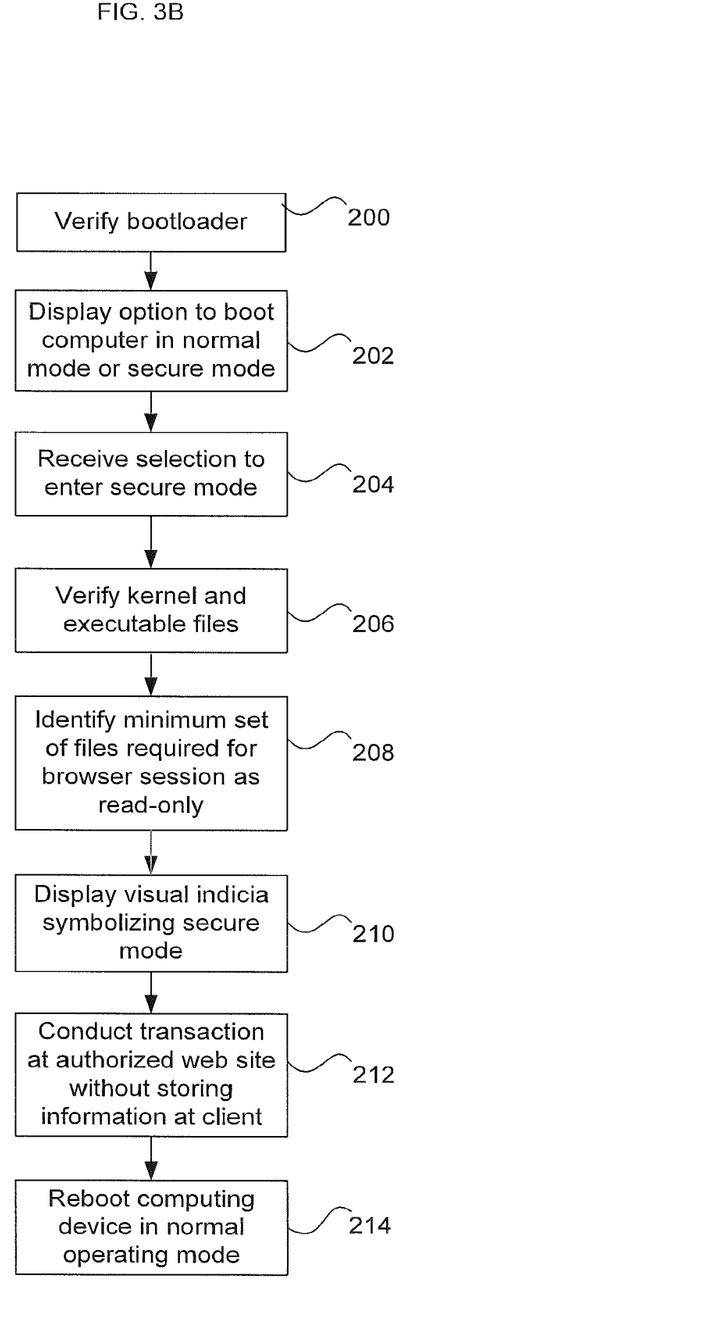

One embodiment of the invention is shown in FIGS. 3A-B where a user may choose to boot a computing device in a secure operating mode to prevent unauthorized parties from intercepting information provided to a web site during a transaction. In particular, FIG. 3A illustrates general aspects of system interaction between a client and a server. And FIG. 3B illustrates a flow diagram showing a computer process for conducting an Internet transaction in a secure operating mode. The actions shown in FIG. 3A will be discussed below with regard to the flow diagram in FIG. 3B.

In particular, operation of a computing device 122 is initiated in response to receiving power. Hardware of the computing device (e.g., system BIOS) executes a program that verifies a bootloader as shown in operation 200. In one embodiment, boot options are provided by the verified and electronically signed bootloader such that the boot options need not be coded in read-only firmware. The verified bootloader causes a prompt 144 to appear on a display 122 of the computing device 102, as shown in operation 202. The prompt 144 provides a user with an option to boot the computing device 102 in a normal operation mode or a secure operation mode.

In the normal operation mode, the computer hardware activates a bootloader to load and execute the operating system kernel of the computing device 102. The kernel initiates startup procedures of the computing device 102 including any executable files required to initialize device procedures. Accordingly, all system drivers, processes, installed browser extensions, etc. are loaded into memory 126, including both ROM and RAM as appropriate. The computing device is thereby enabled to access any available web site.

The user may select to execute the computing device 102 in the secure operating mode in the event that the user intends to conduct a transaction at a web site that may require the user to provide confidential data (e.g., username/password combinations, financial or medical information, documents secured with an electronic signature, etc.). In the secure operating mode, the user is provided with a limited computing environment in which to browse the Internet or other public or private network. As shown in operation 204, the computing device 102 receives the user selection to operate the computing device 102 in a secure mode.

In response to the user selection of the secure operating mode, the computer hardware that is activated at power-up initiates verification of the components that will be loaded to read-only memory during the secure operating mode, as shown in operation 206. The verified bootloader verifies the operating system kernel, which in turn verifies executable files (e.g., device drivers) that are necessary to provide the user with a basic browsing session. The verification process may be performed using known security techniques including the use of a public key to validate the digital signature of each component to be verified.

In one illustrative example, the computer hardware that is activated at power-up executes a verification application to obtain a unique checksum associated with the component to be verified. By way of example only, the verification application may be an applet or executable code which performs a cryptographic process on the component to arrive at the unique checksum. In addition to being unique, the checksum should be cryptographically secure to prevent tampering. Any number of cryptographic algorithms or hashing functions may be used by the verification application to achieve these goals. For instance, the SHA-2 family of hash functions may be employed.

The checksums generated by the verification application may or may not be of fixed length. In an alternative, the verification application may be used on multiple components. Once the checksum has been generated by the verification application, a digital signature such as a user's encryption key is applied to the checksum to "sign" the checksum. The generated checksums may be compared to signed checksums that are attached to each component to be verified. To perform the comparison, the signed checksums may be decrypted using a stored public key (e.g., a key associated with the authorization entity 142). The resulting checksum may then be compared to the checksum generated by the verification application.

After the integrity of all components is verified, as shown in operation 208, a limited set of executable files is loaded into a part of memory 126 that is identified as read-only by the kernel. The loaded executable files constitute the minimum amount required to communicate with a server and provide the user with a basic browsing session to conduct a transaction. Desirably, no third-party system components are loaded in memory 126 (e.g., browser extensions, audio/graphics/chipset drivers, etc.). The remainder of executable files stored in memory 126 is marked as "non-executable" by the kernel.

In operation 210, a visual indicator 146 may be displayed on the display 122 of the computing device 102 to inform the user that the computing device 102 is operating in the secure mode. For example, the visual indicator 146 may be an icon that symbolizes a secure mode (e.g., a lock) or the visual indicator 146 may be text. The computing device 102 is configured such the visual indicator 146 cannot be rendered during the normal operating mode in order to prevent a third party from deceiving the user into believing that he is browsing the Internet in the secure operating mode. For example, a graphics engine may prevent the visual indicator 146 from being displayed during the normal operating mode.

After the computing device 102 is configured to operate in the secure mode, as shown in operation 212, the user may initiate a browser session. In the secure operating mode, the user is only permitted to access web sites that are recognized by the authorization entity as being secure (e.g., websites 148). In one example, the computing device 102 may be configured to operate in the secure mode to access only SSL-enabled web sites, and all browser communication with these websites is SSL-encrypted. In another example, specific web sites or services register with the authorization entity 142 to allow user access in secure mode, and the authorization entity 142 verifies the certificates of the registered web sites or services. A list of the web sites/certificates is signed by the authorization entity 142. Accordingly, the computing device 102 may access the approved web sites or services via the authorization entity 142. In one embodiment, the list of allowed web sites or services can be downloaded from the authorization entity 142 or checked for updates while operating in secure mode. The user may then view the list, search for a specific web site using different criteria (e.g., category, name, region, etc. . . . ), and select a web site to visit.

In one illustrative example, the registration process could be performed by providing the authorization entity 142 with a certificate signed by a trusted third-party. The authorization entity 142 then signs the certificate and includes the signed certificate in a list of secure web sites. In another example, the authorization entity 142 performs manual authorization to verify that the web site requesting registration is owned by the organization it claims to belong to.

The certificates that would be retrieved by a client from the authorization entity 142 should contain sufficient information for the client to be able to locate and access the desired service without relying on any additional step to resolve a service provider's address. For example, it would not be sufficient for the certificate to contain merely the service provider name and the web site domain name, as the client would then still need to query a DNS server for the IP address of the web site. Such an additional step may expose the client to DNS spoofing attacks. Instead, the certificate should include the service provider name, the web site domain and an IP address all signed by the authorization entity 142. In addition, all traffic between the user and the remote service (whether or not HTTP traffic) should be encrypted. Accordingly, the user would not be vulnerable to network sniffing attacks that seek to capture the user's confidential information.

The files that enable the computing device 102 to interact with the web site and conduct the transaction are executed in read-only mode. Accordingly, any information that a user provides to the web site during the transaction is not stored locally on the computing device 102. In other words, the user-provided information is transient data because the data is created within an application session. At the end of the session, the data is discarded without being stored. As a result, information provided by the user cannot be intercepted by any third party because no information is stored on the computing device 102 during the browser session. Accordingly, the user is provided with a secure terminal for security-critical services without exposing the user to security threats that would exist otherwise.

After the user is finished with the transaction, the user may conduct another security-critical transaction at the same web site or at another authorized web site. Alternatively, the user may reboot the computing device 102 to operate in the normal mode, as shown in operation 214, to enable the computing device 102 to access any available web site including web sites that the authorization entity 142 does not recognize as authorized (e.g., websites 150).

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims.

The invention claimed is:

1. A method of providing a secure operating mode of a computing device, the method comprising:
   receiving, by one or more processors, information indicating a selection of the secure operating mode;
   after receiving the information, verifying, by the one or more processors, an operating-system level executable file;
   executing, by the one or more processors, the verified operating-system level executable file in read-only memory order to conduct a transaction in the secure operating mode;
   during the conducting of the transaction, receiving, by the one or more processors, information input to the computing device;
   marking, by the one or more processors, the received information input into the computing device as non-executable; and
   temporarily storing, by the one or more processors, the marked information in volatile memory of the computing device.

2. The method of claim 1, wherein verifying the operating-system level executable file comprises comparing a characteristic of the executable file with an encrypted security value, and wherein the verified operating-system level executable file is executed based on a result of the comparison.

3. The method of claim 1, wherein conducting the transaction includes communicating with a server computing device, and the method further comprises after verifying the operating-system level executable file, verifying and executing only files that are necessary to communicate with the server computing device and conduct the transaction.

4. The method of claim 1, further comprises not executing files stored in a writable portion of memory of the client while conducting the transaction in the secure operating mode.

5. The method of claim 1, wherein verifying the components of the computing device comprises:
   verifying a bootloader file;
   using the bootloader file to verify an operating system kernel file; and
   using the verified operating system kernel file to verify the operating-system level executable file.

6. The method of claim 1, further comprising providing a visual indicator for display on an output device of the computing device during the secure operating mode to indicate that the computing device is operating in the secure operating mode, and wherein a graphics engine prevents the visual indicator from being displayed during a normal operating mode.

7. The method of claim 1, further comprising accessing a web site that is pre-authorized by a server computing device for secure transactions.

8. The method of claim 1, further comprising not storing the marked information in permanent storage of the client device.

9. A system for providing a secure operating mode of a computing device, the system comprising:
   memory configured to store at least one of information and an executable file; and
   one or more processors operatively coupled to the memory, the one or more processors configured to:
   receive information indicating a selection of the secure operating mode;
   after receiving the information, verify an operating-system level executable file;
   execute the verified operating-system level executable file in read-only memory order to conduct a transaction in the secure operating mode;
   during the conducting of the transaction, receive information input to the computing device;
   mark the received information input into the computing device as non-executable; and
   temporarily store the marked information in volatile memory of the computing device.

10. The system of claim 9, wherein the one or more processors are configured to verify the operating-system level executable file comprises comparing a characteristic of the executable file with an encrypted security value, and wherein the verified operating-system level executable file is executed based on a result of the comparison.

11. The system of claim 9, wherein the one or more processors are configured to:
   conduct the transaction by communicating with a server computing device, and
   after verifying the operating-system level executable file, verify and execute only files that are necessary to communicate with the server computing device and conduct the transaction.

12. The system of claim 9, wherein the one or more processors are incorporated into the client device and the one or more processors are further configured to not execute files stored in a writable portion of memory of the client device while conducting the transaction in the secure operating mode.

13. The system of claim 9, wherein the one or more processors are further configured to verify the components of the computing device by:
   verifying a bootloader file;
   using the bootloader file to verify an operating system kernel file; and
   using the verified operating system kernel file to verify the operating-system level executable file.

14. The system of claim 9, wherein the one or more processors are further considered to provide a visual indicator for display on an output device of the computing device during the secure operating mode to indicate that the computing device is operating in the secure operating mode, and the system further comprises a graphics engine configured to prevent the visual indicator from being displayed during a normal operating mode.

15. The system of claim 9, wherein the one or more processors are further considered to access a web site that is pre-authorized by a server computing device for secure transactions.

16. The system of claim 9, wherein the one or more processors are further considered to not storing the marked information in permanent storage.

17. A non-transitory computer-readable storage medium on which computer readable instructions of a program are stored, the instructions, when executed by one or more processors, cause the processor to perform a method of providing a secure operating mode of a computing device, the method comprising:
- receiving information indicating a selection of the secure operating mode;
- after receiving the information, verifying an operating-system level executable file;
- executing the verified operating-system level executable file in read-only memory order to conduct a transaction in the secure operating mode;
- during the conducting of the transaction, receiving information input to the computing device;
- marking the received information input into the computing device as non-executable; and
- temporarily storing the marked information in volatile memory of the computing device.

18. The medium of claim 17, wherein the method includes not executing files stored in a writable portion of memory of the client device while conducting the transaction in the secure operating mode.

19. The medium of claim 17, wherein the method further comprises accessing a web site that is pre-authorized by a server computing device for secure transactions.

20. The medium of claim 17, wherein the method further comprises not storing the marked information in permanent storage of the client device.

\* \* \* \* \*